UNITED STATES PATENT OFFICE 2,268,935

DYESTUFFS OF THE TRIAZOL SERIES AND PROCESS OF MAKING SAME

Walter Hanhart, Riehen, Switzerland, assignor to the firm Society of Chemical Industry in Basle, Basel, Switzerland No Drawing. Application July 12, 1940, Serial No. 345,241. In Switzerland July 29, 1939

15 Claims. (Cl. 260—157)

It has been found that dyestuffs of the triazol series are obtained if dyestuffs which contain the following grouping

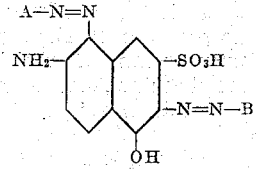

in which A represents the radical of an azo dyestuff and B represents the radical of a diazo compound, and in which at least one of the two radicals A and B contains the salicyclic acid grouping in a terminal benzene nucleus, are oxidised to the corresponding triazols.

The formation of the azo dyestuffs denoted by A in the products of the above formula may take place by the union of the most varied diazo and coupling components, but the choice of these compounds is so to be regulated that a terminal benzene nucleus carries the salicylic acid grouping, in case this is not already contained in B. A may thus stand for the radical of a monazo dyestuff containing two aromatic nuclei. To this group of monoazo dyestuffs belong, for example, those dyestuffs which contain benzene nuclei as well as those which contain ring systems built up from benzene nuclei, such as those of diphenyl or naphthalene. Since in dyestuffs of the formula given above at least one of the radicals A and B must contain the salicylic acid grouping in a terminal benzene nucleus, salicylic acid itself, as well as its substitution products—for example, 6 - methyl - 1 -hydroxybenzene-2-carboxylic acid—as coupling component, or an aminosalicylic acid, for example the 4-amino-1-hydroxybenzene-2-carboxylic acid, as diazo component, are necessary for the synthesis of these monazo dyestuffs, should the radical B not contain the salicylic acid grouping. On the other hand, if the radical B contains the salicylic acid grouping, the terminal aromatic nucleus in A may be substituted as desired, for example, by nitro or hydroxyl groups.

In the preparation of the monazo dyestuffs, tetrazotised diamines which, on the one hand, may be united with one of the coupling components named above may be advantageously used, whereupon on coupling, on the other hand, with 2-amino-5-hydroxy-naphthalene-7-sulfonic acid in acid solution, the second diazo group attaches itself, in the manner shown in the formula given, in the 1-position of the naphthalene nucleus. Tetrazotised diamines which come into consideration are, for example, 4:4'-diaminodiphenyl and its substitution products, such as 3:3'-dimethoxy-4:4'-diaminodiphenyl, or the halogen and methyl substitution products of benzidine, as well as its carboxylic acids and sulfonic acids, for instance dichlorbenzidine, tolidine and benzidine disulfonic acids. Use may also be made of those compounds which are derived from diamines of the benzene series (for example, 1:4-diaminobenzene) such as, for example, mono-4'-aminobenzoyl-1:4-diaminobenzene or monoacetyl - 1:4 - diaminobenzene, in which case the diazotisation of the acetylated amino group only takes place after the first coupling reaction has been carried out and after the acetyl group has been split off.

In dyestuffs of the above formula which serve as parent materials in the present process, the radicals of diazo compounds denoted by B may have as their foundation, for example, diazo compounds of the benzene series, which may be substituted in various ways, for example, by the —NO$_2$, —COOH or —OH groups, as well as the diazo compounds of those amines which contain the amino group united in an azo compound of the benzene series, for example, in a monazo compound, as is the case, for example, in the coupling product obtained from diazotised para-aminosalicylic acid with aminohydroquinone dimethyl ether. Particularly valuable dyestuffs are obtained when B represents the radical of an ortho hydroxydiazo compound of the benzene series, in which case the benzene nucleus may contain as further substituents, for example, the nitro group or halogen, such as chlorine, in addition to the OH-group.

The synthesis of the necessary parent materials of the above formula for the present process may thus be carried out by uniting a tetrazotisable diamine, such as 4:4'-diaminodiphenyl, firstly with one of the coupling components containing the salicylic acid grouping, such as 1-hydroxybenzene-2-carboxylic acid, and secondly, in a weak mineral acid or acetic acid medium, with 2-amino-5-hydroxynaphthalene-7-sulfonic acid, whereupon finally, by coupling in an alkaline medium, one of the diazo compounds mentioned above is introduced into the naphthalene nucleus in the ortho position to the OH-group.

According to the present process, the dyestuffs are oxidised to the corresponding triazols by means of one of the oxidising agents usually employed for the formation of the triazol ring from an ortho-amino-azo grouping. As oxidising agents, in addition to chromic acid and its salts, which operate in acetic acid medium, the salts of copper in combination with organic and inorganic acids, operating in alkaline medium, come particularly in question. This oxidation may take place preferably by the agency of an ammoniacal solution of a copper salt. Since this treatment causes mainly the formation of a complex union of copper at the salicylic acid grouping, as well as at other groups forming metal complexes which, if desired, may be present in the dyestuff molecule (for example, o:o'-hydroxyazo groups) it is necessary to remove the copper from the dyestuff formed. This may take place, for example, by treatment of the dyestuff containing copper with acids, especially with mineral acids, such as hydrochloric acid, at raised temperatures, or by means of hydrogen sulphide or soluble sulphides. The removal of the copper need not take place if it be desired to prepare the corresponding copper complex compound of the dyestuff.

The dyestuffs obtained serve for the dyeing and printing of the most varied industrial materials, for example, animal and vegetable fibres. If, in the formation of the dyestuffs, components are used which give the resultant dyestuffs an affinity for vegetable fibres, then these dyestuffs may advantageously be used for the dyeing and printing of such fibres, such as cotton, linen, rayon, and spun staple fibre from regenerated cellulose, the dyed material being capable of treatment in a separate bath—or in the bath which has been used for dyeing—with substances yielding metals, for example, copper sulphate. They are applicable, dependent on the dyestuff used, according to the processes of French Patents 809,893 and 815,134, and, in this manner, very fast dyeings, which have particular fastness to light and washing, are obtained.

*Example 1*

6.0 parts of the disodium salt of the dyestuff described in Patent 335,809 (table, p. 14), which possesses the formula

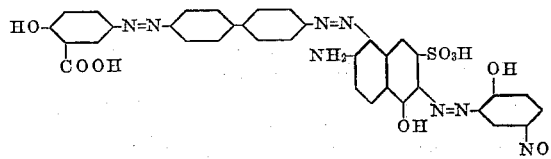

are dissolved at 95° C. in 200 parts of water. An ammoniacally alkaline solution of copper, consisting of 7.5 parts of crystalline copper sulphate, 30 parts of water and 22 parts of ammonia solution of 24% strength, is added, the dyestuff being completely precipitated. The reaction mixture is stirred for about 6 hours and is then allowed to cool. The course of the oxidation may be followed by the removal of samples: the parent dyestuff dissolves in concentrated sulphuric acid with a blue-violet colouration, which is quickly converted into a bluish red. The dyestuff is filtered off, washed with water and boiled with 300 parts of hydrochloric acid solution of about 4% strength in order to convert it into the copper-free compound. After filtering once more and washing, it is converted into the sodium salt in the usual manner by means of soda or caustic soda.

The dry dyestuff, which has the probable formula

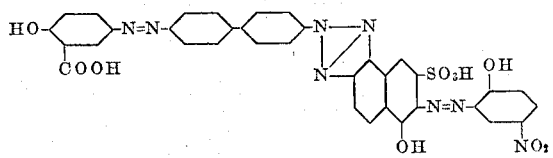

is a dark powder. It dissolves in water to a brown-red solution and dyes cotton from a dyebath containing Glauber's salts in brownish shades which, on being aftertreated with copper salts, yield a red brown shade which is fast to light and washing.

Instead of separating the dyestuff after the oxidation hydrochloric acid may be added directly to the reaction mixture and the whole boiled up.

A dyestuff possessing very similar properties is obtained if, as parent materials, products are used in the preparation of which mono-4'-aminobenzoyl-1:4-diaminobenzene replaces benzidine, or ortho-cresotinic acid replaces salicylic acid.

*Example 2*

24 parts of the disodium salt of the dyestuff of the formula

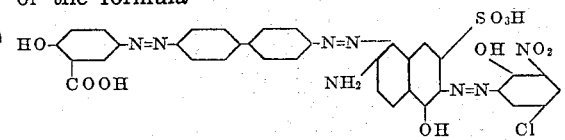

are dissolved in 1200 parts of hot water. At 95° C. a solution consisting of 30 parts of crystalline copper sulphate, 120 parts of water and 88 parts of ammonia solution of 24% strength is added and the reaction mixture is stirred at this temperature for about 3 hours. The precipitated dyestuff is filtered, washed with water and then pasted with 400 parts of water. After addition of 135 parts of hydrochloric acid of 30% strength, the mixture is boiled for about 6 hours, and, after filtration and washing with water, the copper-free dyestuff is converted into the sodium salt by causing it to react with soda or caustic soda.

The dyestuff obtained, which probably possesses the formula

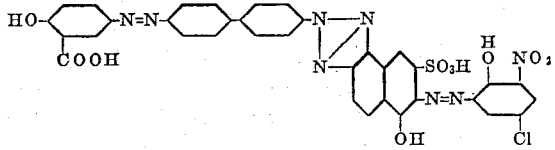

forms, on drying, a dark coloured powder, which dissolves in concentrated sulphuric acid with a violet colour and in water with a greenish colour. It dyes cotton from a bath containing Glauber's salts in greenish shades, which are converted into brown shades, fast to washing and light, on aftertreatment with copper salts.

Example 3

5 parts of the disodium salt of the dyestuff of the formula

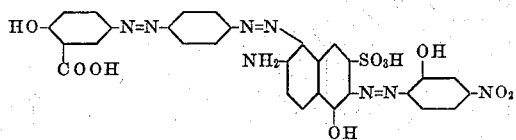

are dissolved in 250 parts of hot water. A solution containing 6.3 parts of crystalline copper sulphate, 25 parts of water and 18.5 parts of ammonia solution of 24% strength is added, and the reaction mixture is stirred for about 6 hours at 95–95° C. The precipitate formed is filtered off and pasted with 100 parts of water; 30 parts of hydrochloric acid of 30% strength are added, and the reaction mixture is boiled for about 6 hours, after which the copper-free dyestuff is converted in the usual manner into the sodium salt.

The dry dyestuff is a dark brown powder of the probable formula

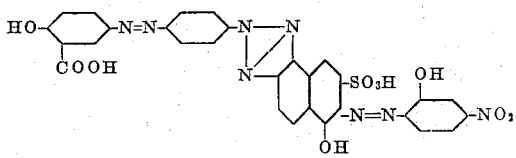

It dissolves in concentrated sulphuric acid with a red-violet colouration and in water to a brownish solution, and dyes cotton in brownish shades from a bath containing Glauber's salts. On aftertreating these dyeings with copper salts, they are converted into strong dark brown shades, which possess good fastness to washing and light.

Example 4

5 parts of the sodium salt of the dyestuff of the formula

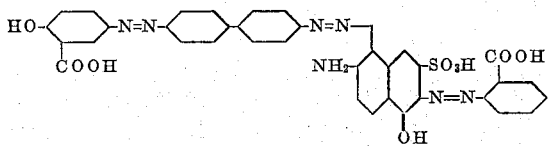

are dissolved in 250 parts of hot water. At 95° C. a solution consisting of 6.3 parts of crystalline copper sulphate, 25 parts of water and 18.5 parts of ammonia solution of 24% strength is added and the reaction mixture is stirred for about 6 hours at 90–95° C. The precipitated dyestuff is filtered off, and is freed from metal by boiling for 6 hours in 100 parts of water and 30 parts of hydrochloric acid of 30% strength, after which it is converted into the sodium salt by treatment with soda or caustic soda in the usual manner.

The dry dyestuff is a reddish powder of the probable formula

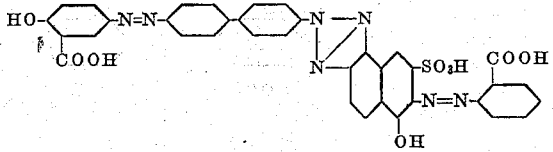

which dissolves in concentrated sulphuric acid to a bluish-red solution and in water to a brownish red solution. It dyes cotton from a bath containing Glauber's salt in brown red shades which become fast to washing and light on aftertreatment with copper salts.

If the corresponding dyestuff obtained from 5-nitro-2-amino-benzoic acid be used, brown dyeings are obtained.

Example 5

5 parts of the disodium salt of the dyestuff of the formula

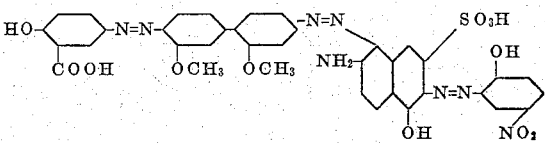

are dissolved in 250 parts of hot water. At 95° C. a solution containing 10 parts of crystalline copper sulphate, 40 parts of water and 26.5 parts of ammonia solution of 24% strength is added, and the reaction mixture is stirred for about 6 hours at 90–95° C. After addition of 120 parts of hydrochloric acid of 30% strength to the reaction mixture, it is boiled for 6 hours, then filtered, and the dyestuff obtained is washed well and converted into the sodium salt in the usual manner.

The dry dyestuff is a dark-coloured powder of the probable formula

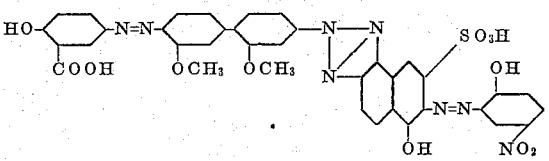

which dissolves in concentrated sulphuric acid to a bluish-red, in water to a brownish solution, and which dyes cotton from a bath containing Glauber's salt in brown shades, which are converted by aftertreatment with copper salts into fast red-brown shades.

Example 6

3 parts of the sodium salt of the dyestuff of the formula

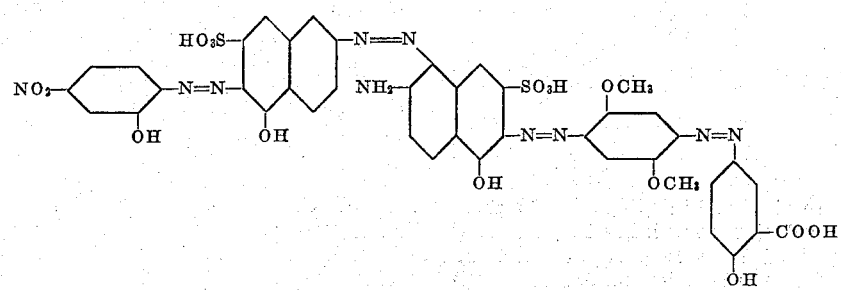

are dissolved in 150 parts of hot water, and, at about 95° C. a solution containing 5 parts of crystalline copper sulphate, 20 parts of water and 14 parts of ammonia solution of 24% strength is added and the mixture stirred for about 6 hours at 90–95° C. After addition of 63 parts of hydrochloric acid of 30% strength, the re- The dry dyestuff obtained is a dark-coloured powder of the probable formula

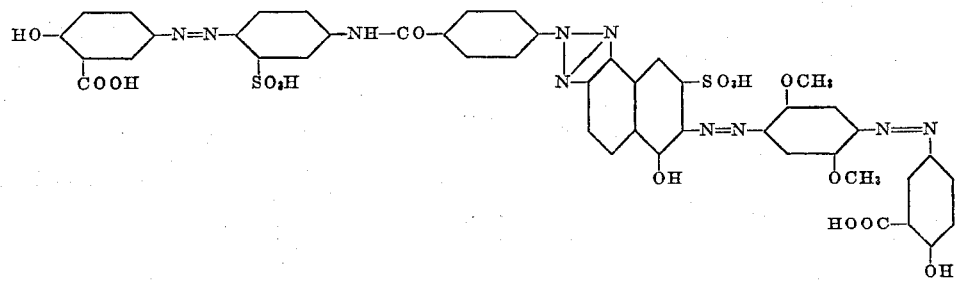

action mixture is boiled for about 6 hours and filtered, the dyestuff remaining on the filter being washed with water and then converted into the sodium salt in the usual manner.

The dry dyestuff is a dark powder of the probable formula

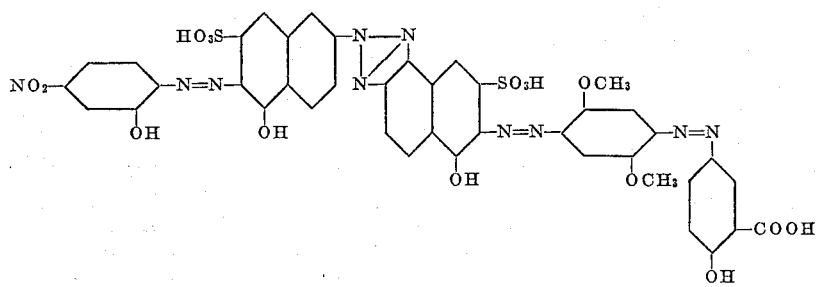

which dissolves in concentrated sulphuric acid or in water with formation of a blue solution. It dyes cotton from a bath containing Glauber's salt in grey-blue shades, which become fast to washing and light on aftertreating with copper salts.

*Example 7*

5 parts of the sodium salt of the formula

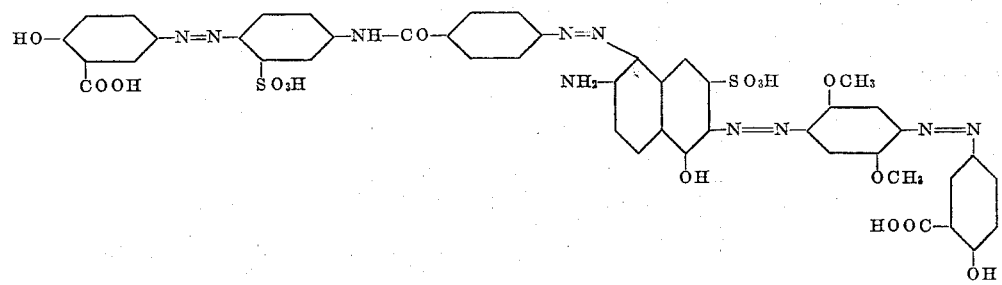

are dissolved in 250 parts of hot water. At 95° C. a solution containing 10 parts of crystalline copper sulphate, 40 parts of water and 26.5 parts of ammonia solution of 24% strength is added, and the reaction mixture is stirred for some hours at 90–95° C. After addition of 120 parts of hydrochloric acid of 30% strength, the mixture is boiled for 6 hours: it is then filtered, and the precipitate is washed and converted into the dyestuff sodium salt in the usual manner.

It dissolves in concentrated sulphuric acid to a brownish, in water to a blue-green solution and dyes cotton from a bath containing Glauber's salt in blue-green shades, which become yellower and faster to washing and light on treatment with copper salts.

*Example 8*

5 parts of the trisodium salt of the dyestuff of the formula

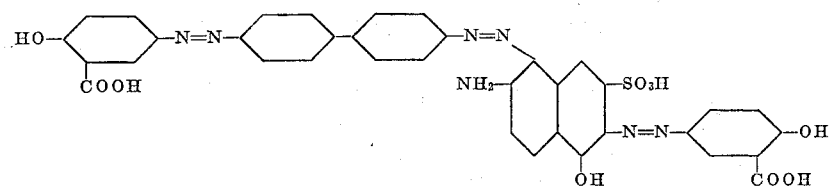

are dissolved in 250 parts of water. At 95° C. a solution containing 6.25 parts of crystalline copper sulphate, 25 parts of water and 18 parts of ammonia solution of 24% strength is added, and the reaction mixture is stirred for about 4 hours at 90–95° C., the colour of its solution in concentrated sulphuric acid changing from blue to red. After addition of 104 parts of hydrochloric acid of 30% strength, the reaction mixture is then boiled for 6 hours. It is now filtered, and the precipitate is washed thoroughly with water and converted into the dyestuff sodium salt by the usual methods.

The dry dyestuff is a dark-coloured powder which dissolves in concentrated sulphuric acid to a red, in water to a yellow-brown solution and possesses the probable formula

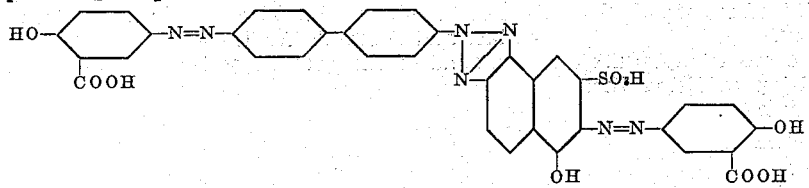

It dyes cotton from baths containing Glauber's salt in shades of yellow brown, which give brown shades fast to washing on being treated with copper salts.

*Example 9*

100 parts of cotton material are entered at 50° C. into a dyebath consisting of 3000 parts of water, 1 part of the dyestuff obtained according to Example 2 and 2 parts of anhydrous sodium carbonate. The temperature is raised to 90° C., and, after ¼ hour, 30 parts of crystalline sodium sulphate are added and dyeing is continued for a further ¾ hour at 90-95° C. The material is then rinsed and treated in a fresh bath containing 3 parts of crystalline copper sulphate and 1 part of acetic acid of 40% strength for ½ hour at 70-80° C. after which it is rinsed as usual, soaped for a short time if desired, and dried. The cotton has been dyed in a fast brown shade.

*Example 10*

A dyebath is prepared containing 2000 parts of water, 1 part of the dyestuff obtained according to Example 1 and 2 parts of anhydrous sodium carbonate. 100 parts of cotton are entered at 40° C., the temperature is raised to the boil over a period of ¼ hour, 30 parts of crystalline sodium sulphate are added, and dyeing is continued for 1 hour at 90° C. At this point, 66 parts by volume of a solution, containing 10 parts of crystalline copper sulphate, 12 parts of tartaric acid, 1000 parts of water and sufficient concentrated caustic soda solution to cause the solution to react neutral, are added. The material is treated for a further ½ hour at 90° C. and is then thoroughly rinsed with cold water, soaped if desired and dried as usual. The cotton is dyed in fast red-brown shades.

What I claim is:

1. Process for the manufacture of dyestuffs of the triazol series, comprising oxidising dyestuffs containing the grouping

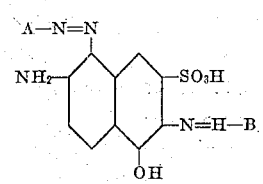

in which A represents the radical of a mono-azo dyestuff and B represents the radical of a diazo compound of the benzene series, and in which at least one of the two radicals A and B contain the salicylic acid grouping in a terminal benzene nucleus, to the corresponding triazols.

2. Process for the manufacture of dyestuffs of the triazol series, comprising oxidising dyestuffs containing the grouping

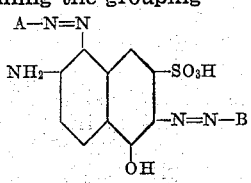

in which A represents the radical of a mono-azo dyestuff containing at least 2 aromatic nuclei and B represents the radical of a diazo compound of the benzene series, and in which at least one of the two radicals A and B contain the salicylic acid grouping in a terminal benzene nucleus, to the corresponding triazols.

3. Process for the manufacture of dyestuffs of the triazol series, comprising oxidising dyestuffs containing the grouping

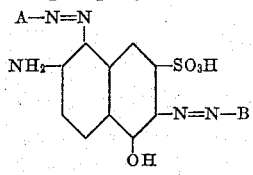

in which A represents the radical of a mono-azo dyestuff containing at least 2 aromatic nuclei and B represents the radical of a diazo compound of the benzene series, and in which at least one of the two radicals A and B contain the salicylic acid grouping in a terminal benzene nucleus, to the corresponding triazols with the help of copper compounds.

4. Process for the manufacture of dyestuffs of the triazol series, comprising oxidising dyestuffs containing the grouping

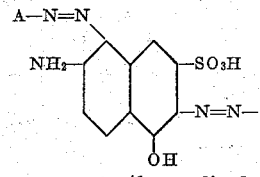

in which A represents the radical of a mono-azo dyestuff containing at least 2 aromatic nuclei and B represents the radical of a diazo compound of the benzene series, and in which at least one of the two radicals A and B contain the salicylic acid grouping in a terminal benzene nucleus, to the corresponding triazols with the help of ammoniacal solutions of copper salts, and removing from the dyestuffs obtained copper which is combined in complex form.

5. Process for the manufacture of dyestuffs of the triazol series, comprising oxidising the dyestuff of the following formula

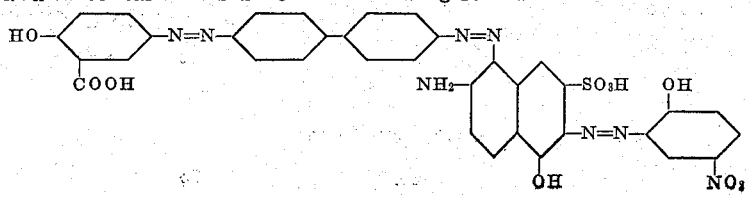

with the help of ammoniacal solutions of copper salts to the corresponding triazols, and removing from the dyestuffs obtained copper which is combined in a complex form.

6. Process for the manufacture of dyestuffs of the triazol series, comprising oxidising the dyestuff of the following formula

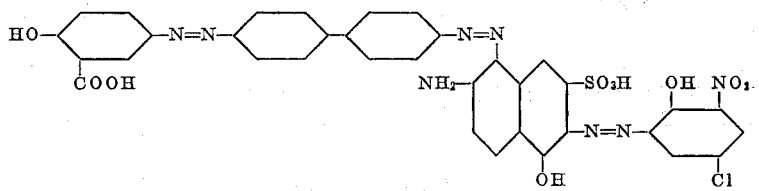

with the help of ammoniacal solutions of copper salts to the corresponding triazols, and removing from the dyestuffs obtained copper which is combined in a complex form.

7. Process for the manufacture of dyestuffs of the triazol series, comprising oxidising the dyestuff of the following formula

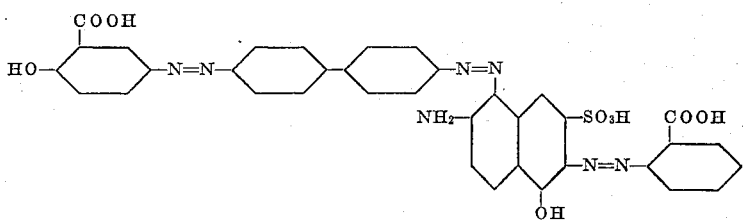

with the help of ammoniacal solutions of copper salts to the corresponding triazols, and removing from the dyestuffs obtained copper which is combined in a complex form.

8. Dyestuffs of the general formula

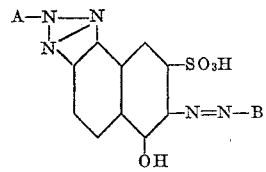

in which A represents the radical of a monoazo dyestuff, and B represents the radical of a diazo compound of the benzene series, and in which at least one of the radicals A and B contains the salicylic acid grouping in a terminal benzene nucleus.

9. Dyestuffs of the general formula

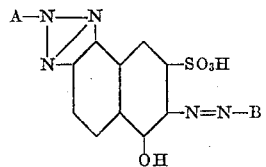

in which A represents the radical of a mono-azo dyestuff containing at least 2 aromatic nuclei and B represents the radical of a diazo compound of the benzene series, and in which at least one of the radicals A and B contains the salicylic acid grouping in a terminal benzene nucleus.

10. Dyestuffs of the general formula

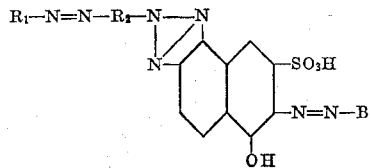

in which $R_1$ represents the radical of a benzene nucleus containing the salicylic acid grouping, $R_2$ represents the radical of a tetrazotizable diamine, and B stands for the radical of a diazo compound of the benzene series.

11. Dyestuffs of the general formula

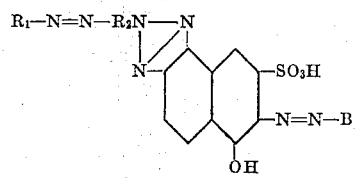

in which $R_1$ represents the radical of a benzene nucleus containing the salicylic acid grouping, $R_2$ represents a diphenyl radical, and B stands for the radical of a diazo compound of the benzene series.

12. Dyestuffs of the general formula

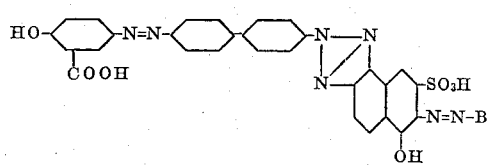

in which B represents the radical of a diazo compound.

13. The dyestuff of the formula

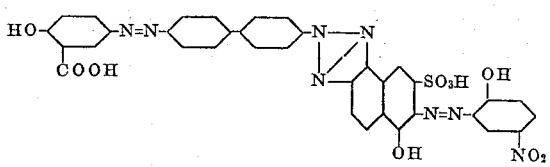

14. The dyestuff of the formula

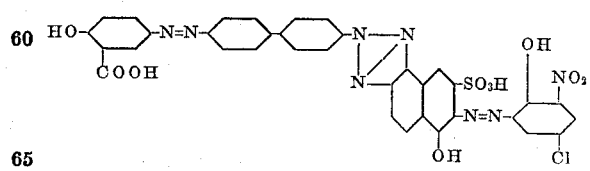

15. The dyestuff of the formula

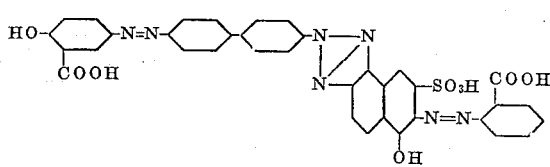

WALTER HANHART.